United States Patent [19]

Augustin et al.

[11] 4,221,601

[45] Sep. 9, 1980

[54] PACKAGED PIGMENT PASTES AND PROCESS FOR COLORING AND TONING WATER-DILUTED COATING AGENTS

[75] Inventors: Friedrich Augustin, Frechen; Lothar Bartling, Glessen, both of Fed. Rep. of Germany

[73] Assignee: BASF Farben & Fasern AG, Hamburg, Fed. Rep. of Germany

[21] Appl. No.: 757,199

[22] Filed: Jan. 6, 1977

[30] Foreign Application Priority Data

Jan. 26, 1976 [DE] Fed. Rep. of Germany ....... 2602736

[51] Int. Cl.$^2$ .............................................. C08L 1/08
[52] U.S. Cl. .................... 106/171; 106/186; 106/188; 106/189; 106/193 J; 106/193 P; 106/193 M; 106/194; 106/197 C; 106/198; 106/308 F; 106/308 N; 106/308 S; 260/17.4 R; 260/29.6 WA; 260/29.6 BE; 260/29.6 Z; 260/29.6 N; 260/29.6 E; 260/42.21; 260/42.22
[58] Field of Search ............ 106/193 J, 193 R, 308 Q, 106/171, 186, 189, 193 P, 193 M, 194, 197 C, 198, 308 F, 308 N, 308 S; 260/42.51, 29.6 R, 17.4 R, 29.6 WA, 29.6 BE, 29.6 Z, 29.6 N, 29.6 E, 42.21, 42.22; 252/316, 90, 93

[56] References Cited

U.S. PATENT DOCUMENTS

| | | | |
|---|---|---|---|
| 2,942,997 | 6/1960 | Bram et al. | 106/308 Q |
| 3,016,308 | 1/1962 | Macaulay | 106/22 |
| 3,093,603 | 6/1963 | Gilchrist | 106/308 Q |
| 3,198,740 | 8/1965 | Dunlop et al. | 252/93 |
| 3,277,009 | 10/1966 | Freifeld et al. | 252/90 |
| 3,300,546 | 1/1967 | Baechtold | 252/90 |
| 3,322,674 | 5/1967 | Friedman | 252/93 |
| 3,458,328 | 7/1969 | Zola | 260/29.6 |
| 3,663,275 | 5/1972 | Owens | 106/193 J |
| 3,839,074 | 10/1974 | Taylor | 106/193 J |

*Primary Examiner*—Lorenzo B. Hayes
*Attorney, Agent, or Firm*—Gilbert L. Wells

[57] ABSTRACT

Process for coloring and toning water-diluted coating agents with pigment pastes. At least one film pack which is made of water-soluble films, sealed on all sides and filled with a pigment paste is immersed in the water-diluted coating agent, and after dissolution of the pack, the paste is uniformly dispersed. The pigment paste comprises:

I. inorganic and/or organic pigments and/or;
II. extenders and/or fillers, components I and II being dispersed in components III and IV;
III. 10-80% by weight of the sum of the amounts by weight of components I and II of monohydric primary, secondary or tertiary aliphatic straight-chain or branched alkanols with 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols or unsaturated alcohols; and
IV. 5-20% by weight, relative to the content of the components I and II, of wetting agents, dispersing agents and/or emulsifiers which are soluble in component III.

10 Claims, No Drawings

PACKAGED PIGMENT PASTES AND PROCESS FOR COLORING AND TONING WATER-DILUTED COATING AGENTS

CROSS-REFERENCE TO A RELATED APPLICATION

Applicants claim priority under 35 USC 119 for application P 26 02 736.1-43 filed Jan. 26, 1976 in the Patent Office of the Federal Republic of Germany.

The invention relates to a process for colouring and toning water-diluted coating agents with pigment pastes. In addition, the invention relates to film packs filled with the pigment pastes and the use of these packs for colouring and toning the water-diluted coating agents.

Hitherto, for toning lacquers and gloss paints, special toning pastes have been produced for very diverse binder systems. This was effected by dispersing pigments, fillers and dyestuffs in water, solvents, synthetic resins and other film-forming binders with the aid of the grinding equipment customary in the lacquer industry. Pigment pastes of this type were weighed out depending on the colour shade desired and metered in by stirring the paste into the liquid coating agent. Another procedure for producing colour shades for latex paints is to mix dry pigments, enriched with wetting agents and dispersing agents, into a paste with water and to stir the paste into the aqueous dispersion. These toning pastes or the dry pigments are added by weight or by volume.

It is a disadvantage that the toning pastes dry up, cake and form a skin and the pigments settle out and the paste can therefore be handled only with difficulty and, without an adequate metering device, can be processed only extremely inaccurately by the operator. Working with colour pastes is involved and working with dry pigments is virtually impossible.

The object on which the invention is based is to provide a possibility for preparing pigment pastes of this type in such a way that they can be processed without the known disadvantages and that it is possible, without a metering device, to effect metering which enables the production of the colour shades to be carried out reproducibly with sufficient accuracy.

The object on which the invention is based is achieved by a process for colouring and toning water-diluted coating agents with pigment pastes which is characterized in that at least one film pack which is made of water-soluble films, sealed on all sides and filled with a pigment paste consisting of the components I. inorganic and/or organic pigments and/or II. extenders and/or fillers, components I and II being dispersed in components III and IV, III. 10-80% by weight of the sum of the amounts by weight of components I and II of monohydric primary, secondary or tertiary aliphatic straight-chain or branched alkanols with 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols or unsaturated alcohols and IV. 5-20% by weight, relative to the content of components I and II, of wetting agents, dispersing agents and/or emulsifiers which are soluble in component III, is immersed in the water-diluted coating agent and, after dissolution of the pack, the paste is uniformly dispersed.

The use of a film pack made of water-soluble films as a packaging or wrapping material for pigment pastes, which are of low viscosity or high viscosity, of the type described above was surprising and not to be foreseen. The use of the film pack filled with a pigment paste for direct colouring and toning of water-diluted coating agents, without the dissolved film in the coating agent exerting any negative influence on the processing of the coating agent, was also surprising.

Accordingly, a further subject of the invention is a film pack for colouring and toning water-diluted coating agents with pigment pastes, which is characterized by a pigment paste consisting of the components I. inorganic and/or organic pigments and/or II. extenders and/or fillers, components I and II being dispersed in components III and IV, and III. 10-80% by weight of the sum of the amounts by weight of components I and II of monohydric primary, secondary or tertiary aliphatic straight-chain or branched alkanols with 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols or unsaturated alcohols and IV. 5-20% by weight, relative to the content of components I and II, of wetting agents, dispersing agents and/or emulsifiers which are soluble in component III, this paste forming the contents of a water-soluble film which is folded to form containers and sealed on all sides. The filled film pack has preferably been processed in the form of bags.

In the text which follows, "water-diluted coating agents" are understood as all coating agents which contain water as an essential diluent or as the solvent. The film-forming binders can be in the form of a dispersion or a solution in the water-diluted coating agents. The coating agents can also contain organic solvents. Advantageously, the solvents used are those which are miscible with water. By choosing suitable binders and suitable organic solvents it is possible to produce the water-diluted coating agents in all transitions between a dispersion and a solution. Therefore, the term "water-diluted coating agent" comprises not only dispersions or solutions but also mixtures of dispersions and solutions. The water-diluted coating agents are in the form of aqueous dispersions or water-dilutable lacquers when in the non-pigmented form or in the form of latex paints, gloss paints, mastics or stoppers and the like when they contain pigments and/or fillers. Depending on the binder, they are suitable for air drying coatings or for stoving coatings.

In order to carry out the process according to the invention, the pigment pastes and packaging materials must be suited to one another. The solvents, wetting agents, dispersing agents and emulsifiers and also the pigments in the pigment pastes must not attack the packing film. Moreover, the pigment paste must be of such composition that it mixes easily together with the packing or the bag in the water-diluted coating agent and is thus compatible. This is achieved by a pigment paste which consists of the components I. inorganic and/or organic pigments and/or II. extenders and/or fillers, components I and II being dispersed in components III and IV, and III. 10–80% by weight of the sum of the amounts by weight of components I and II of monohydric primary, secondary or tertiary aliphatic straight-chain or branched alkanols with 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols or unsaturated alcohols and IV. 5–20% by weight, relative to the content of components I and II, of wetting agents, dispersing agents and/or emulsifiers which are soluble in component III.

A pigment paste of this type of composition can be packed in portions in a container, especially a bag which is sealed on all sides, made from a water-soluble film and, together with the film packing, dissolves in the water-diluted coating agent or is miscible and compatible with this, so that film packs of this type can be used direct for colouring and toning and it is possible to use these packs to tone to any desired colour shade.

Inorganic and/or organic pigments are used as component I for the manufacture of the pigment pastes. These pigments include all the pigments, including metal powders, carbon black and transparent dyestuffs, which are used in the lacquer industry for colouring and toning. Pigments which are fast to light, resistant to alkali and resistant to weathering are particularly preferred. Comprehensive literature exists on the large number of pigments. Only Römpps Chemie-Lexikon (Chemical Dictionary), 1974, pages 2,693 to 2,695 is mentioned here as a general summary.

Components II are fillers and/or extenders. These are commercially available extenders which are generally used in the lacquer industry in order to vary the technical applicability of the coating agents. This group includes, for example, calcium carbonate, calcium sulphate, chalk, gypsum, kaolin, barium sulphate, alumina, silica, kieselguhr, mica, asbestos powder, magnesium silicates, dolomite, quartz powder, glass powder, talc and inorganic and organic fibres, such as asbestos fibres, glass fibres, rock wool, cellulose fibres, polyester fibres, polyamide fibres, polyacrylonitrile fibres and cotton.

Compounds which are intended for use as component III for the manufacture of the pigment pastes are monohydric primary, secondary or tertiary aliphatic straight-chain or branched alkanols with 1 to 4 carbon atoms, for example methanol, ethanol, n-propanol, iso-propanol, n-butanol, 2-methylpropanol, 2-hydroxybutane and 2-hydroxy-2-methylpropane. Further compounds intended for use are alkylene glycols, alkylene glycol monoalkyl ethers, polyalkylene glycols and polyalkylene glycol monoalkyl ethers.

Examples which may be mentioned are: ethylene glycol, 1,2-propylene glycol, 1,2-butylene glycol, diethylene glycol (=ethylene glycol monohydroxyethyl ether), triethylene glycol (=ethylene glycol di-(hydroxyethyl) ether), ethylene glycol monomethyl ether, ethylene glycol monoethyl ether, ethylene glycol mono-n-propyl ether, ethylene glycol mono-n-butyl ether, diethylene glycol mono-n-butyl ether, diethylene glycol mono-n-propyl ether, diethylene glycol monoethyl ether and diethylene glycol monomethyl ether. It is also intended to use alicyclic alcohols, such as, for example, cyclohexanol and methylcyclohexanol, araliphatic alcohols, such as benzyl alcohol and methylbenzyl alcohol, and unsaturated alcohols, such as, for example, allyl alcohol. These substances can form the component III, either on their own or as a mixture with at least one other of the abovementioned substances.

The pigment paste contains, as component IV, 5–20% by weight, relative to the content of components I and II, that is to say a relatively high concentration, of wetting agents, dispersing agents or emulsifiers which are soluble in component III. Examples of component IV are fatty alcohols, fatty alcohol sulphonates, alkyl-aryl-sulphonates, alkyl-aryl-polyglycol ethers, fatty acid amines, mono-, di- and tri-alkanolamines, fatty alcohol oxethylates, fatty acid alkanolamides, alkali metal salts of polyacrylic acids, soya lecithin and polyethylene oxide.

Component IV is required so that the pigment pastes can be dispersed in the water-diluted coating agents without problems and without flocculation of the pigments and the fillers or extenders.

The pigment pastes are manufactured with the aid of the customary grinding equipment and dispersing equipment, such as dissolvers, ball mills, sand mills, colloid mills, corundum mills and roll mills.

If component I and/or component II are dispersed only in component III, stable pigment pastes which are suitable for use in practice and can be used as the filling in film packs made of water-soluble films are not formed. After the pack has dissolved in the water-diluted coating agents, the pigments and/or the fillers cannot be dispersed in the coating agent but form agglomerates and flocculate, which renders the coating agents useless. Storage stability of the finely disperse pigment paste in the film pack and, furthermore, an extremely uniform distribution of the pigment paste in the water-diluted coating agent with a high degree of dispersion of the pigment particles down to the primary particles is made possible only by the additional use of component IV in a relatively high concentration, that is to say in 5–20% by weight of the amounts by weight of components I and II.

According to the invention, a water-soluble film is used as the packaging material. This film should be able to hold and store the pigment paste without being attacked. After the pack, which is sealed on all sides, has been immersed in the water-diluted coating agent, the pack should dissolve readily and, together with the pigment paste, be compatible with the water-diluted coating agent and form a homogeneous film of uniform colour after the coating has been cured or dried. This was achieved, surprisingly, with a water-soluble film from the group comprising polyvinyl alcohol. Films of this type are colourless and transparent. They are insoluble in organic solvents and soluble in water. The commercially available polyvinyl alcohols as a rule contain between 0.5 and 2% of ester groups, which originate from incomplete saponification during the process of manufacture by saponification of polyvinyl acetate and exert no influence on the characteristic properties of polyvinyl alcohol. However, polyvinyl alcohols which have a higher acetate content and are produced by partial saponification of polyvinyl acetate are also still soluble in water. Thus, a polyvinyl alcohol which still contains 35% of the original acetyl groups is still soluble in cold water. However, products which have such a high acetate content already display a considerable solubility in water-containing organic solvents. According to the invention, the films used are those which are insoluble in the organic solvents which form component III, that is to say those which have a relatively low acetate content, which can vary depending on the degree of polymerisation.

Although water-soluble films from the group comprising polyvinyl alcohol are to be preferred, commercially available water-soluble films of a different chemical composition are also suitable for the purpose according to the invention. Thus, films of carboxyalkylcellulose, the alkali metal salts of which are soluble in water, can also be used successfully. Examples are the salts of carboxymethylcellulose, carboxyethylcellulose and carboxymethylpropylcellulose.

It is true that packaging processes for highly viscous compositions containing organic solvents are already known. However, with these known processes, plastic laminate films which consist of polyethylene and polyamide and serve, for example, to hold unsaturated polyester stoppers or to hold liquid disinfectants and pesticides, are used. The task of these laminate films is to pack highly viscous or pasty compositions containing organic solvents cheaply and to make it possible to store these for a prolonged period without the pack material becoming useless due to the escape or diffusion of organic solvents. The known polyamide and polyethylene films are not soluble in water.

The fact that the pigment pastes on which the invention is based can also very readily be filled into the water-soluble films according to the invention, which are folded to form containers and welded, and stored without these pastes thickening, sedimenting or agglomerating, that is to say that these films are also diffusion-tight in respect of the solvents in the pigment paste, was the more surprising. In addition, it has been found that mixing component III with component IV surprisingly led to plasticizing of the polyvinyl alcohol films, which resulted in the relatively brittle film becoming more flexible and more resistant to mechanical stress, without the rate of dissolution being reduced. It was also found that the variations in atmospheric humidity did not lead to coagulation and agglomeration.

It was also surprising that the packaged packs containing the pigment paste filling can be completely dissolved in a water-diluted coating agent of low viscosity or high viscosity, even after a short immersion time, and uniformly dispersed by stirring, so that a desired homogeneous colour shade results, which is reproducible time and again without a special metering device, such as a balance or a volume meter or an automatic toning machine being necessary. It is possible even homogeneously to dissolve and to disperse a pack of this type in a highly viscous aqueous stopping composition or plaster composition.

Immersion of the pack, containing the pigment paste, in a water-diluted coating agent effects immediate dissolution of the pack and uniform distribution of the pigment paste in the aqueous media. Although the packaging film is diffusion-tight in respect of the solvents in the pigment paste, in the aqueous medium the film is first very greatly swollen by the water, with the aid of the wetting agents, dispersing agents and emulsifiers and by the osmotic action of the alcohols, so that a diffusion process between the aqueous medium and the pigment paste is set up. Because of the good wetting action, the pigment paste, which flows out after the bag has burst and dissolved, immediately disperses, with the dyestuff content, in the aqueous dispersion and the alcoholic phase of the pigment paste is immediately uniformly further diluted by the water. Simple stirring gives a completely homogeneous colour shade within a short time and, when this is applied to an absorbent or non-absorbent substrate, it displays no flooding phenomena.

With the process according to the invention it is possible to produce any desired colour tonings in very diverse colour shades and depth of colour. Thus, it is possible to add to a water-diluted coating agent either only a single bag containing a single pigment paste or any desired number of bags containing one and the same colour paste or containing different pigment pastes. The packs themselves can be of different sizes and be filled with different amounts.

By means of the process it is possible to meter a very specific amount of toning paste, in the form of a pack, into a given amount of water-diluted coating agent. This matched ratio between the coating agent to be toned and the toning paste present in the pack makes possible metered toning to a desired colour shade without great effort. It is necessary only that the correct amount of pigment paste is present in one or more packs. This system represents a great technical advance compared with conventional toning by weighing out or measuring pigment pastes. Moreover, there are no further safety precautions which need to be taken because of the danger of contamination when using loose pigment pastes. Contamination due to free pigment pastes no longer arises when the filled packs are used.

The combination of a very specific film with a very specific composition of pigment paste in the form of a pack in which the pigment paste is packed leads to very special effects which are not achieved by the individual components if these are employed separately.

Thus, pigments and fillers or extenders cannot be dispersed in alcohols alone and do not lead to serviceable toning pastes which can be utilized industrially. Surprisingly, a pigment paste which possesses excellent stability, can be packed without decomposition in the film used according to the invention and, moreover, is compatible with the water-diluted coating agents and can be dispersed in these coating agents by simple stirring, without flocculating out or giving rise to flocculation phenomena, is obtained only by the combination of the solvents of component III with the wetting agents, dispersing agents and emulsifiers of component IV. These properties are achieved by the use of component IV in an unexpectedly and uncommonly high concentration. Despite this concentration, the additional use of component IV gives rise to no adverse effects in the water-diluted coating agent.

In addition, the pigment paste mixture also effects an improvement in the flexibility and the mechanical strength of the water-soluble film which is used. Although the films are in themselves brittle and not very suitable for packaging purposes, the pigment paste which is filled into the films effects this unexpected improvement in the use characteristics of the sealed pack. At the same time, the insensitivity of the water-soluble film to atmospheric humidity is also increased by the pigment paste filling.

In the water-diluted coating agent, the pigment paste present in the pack effects rapid diffusion of water into the bag and vice versa. As a result, the osmotic pressure in the bag increases so greatly that the bag swells and very rapidly bursts and starts to dissolve and as a result pours the colour paste into the surrounding coating agent. Due to the low surface tension of the pigment paste, the pigments, which are dispersed down to primary particles, disperse very rapidly and uniformly in the water-diluted coating agent. This was surprising and not to be expected.

The flow and levelling properties, and also the resistance to cold and the film-forming capacity of water-diluted coating agents are even further improved by the pigment pastes according to the invention and by the water-soluble film which is employed, without the other properties being changed or impaired.

The use of a bag pack makes it possible to effect precise metering of the pigment paste without additional metering devices, since all of the pigment paste is dispersed and no losses result. Metering is effected by different sizes of pack and by different contents in the packs. Depending on the number of bags, which contain identical or different pigments, which are added, it is possible to produce any desired number of colour shades.

The process according to the invention has indicated for the first time a means of colouring and toning water-diluted coating agents which is very simple and does not pollute the environment.

The examples which follow are intended to illustrate, but not to restrict, the application. Parts are understood as parts by weight and percent as percent by weight.

EXAMPLE 1

A pigment paste consisting of the following components: 10 parts of an alkyl-phenol ethylene oxide adduct with a hydroxyl number of about 90, a solidification range of about 0° C. and a density of about 1.06, 18 parts of 1,2-propylene glycol and 52 parts of iron oxide yellow, is produced with the aid of a dissolver.

During the stirring operation, the paste warms up to about 40° C. After 30 minutes, a particle size of about 5 microns is reached. The paste is then further diluted with 20 parts of 1,2-propylene glycol while it is still warm.

After cooling to room temperature, the paste is filled in portions into a polyvinyl alcohol film folded into bags. Packs containing a net weight of 10 g, 100 g or 200 g are produced. After filling, the bag is welded by means of high frequency and sealed on all sides.

The polyvinyl alcohol film used contains about 2% of acetyl groups.

When a bag containing a nett weight of 10 g is immersed in a white latex paint which is based on polyvinyl propionate and has been filled in a nett weight of 4 kg into a tin, the bag dissolves after an immersion time of 5 minutes. A homogeneous pastel shade in a light ochre colour shade is obtained by stirring. If more bags are added to the latex paint, the colour shade becomes deeper. A medium colour shade is achieved immediately with a 100 g bag. If still further bags are added, an ochre colour shade is obtained.

The latex paint prepared and toned in this way can be processed with a brush, a roller or a spray gun and after drying gives a uniform colour shade.

EXAMPLE 2

A pigment paste is produced from 1 part of the sodium salt of polyacrylic acid, 9 parts of myristic acid monoethanolamide, 15 parts of ethylene glycol, 10 parts of ethylene glycol monoethyl ether and 30 parts of phthalocyanine blue, with the aid of a ball mill containing porcelain spheres.

After a grinding time of 48 hours, a particle size of less than 10 microns is obtained. The ground material is diluted with 35 parts of n-propanol.

The paste is filled in portions into bags made from a carboxymethylpropylcellulose film. After a filled bag has been immersed in a white latex paint, the bag dissolves within a few minutes and the toning paste is dispersed in the latex paint by stirring. A blue colour shade results.

EXAMPLE 3

A pigment paste is produced from the following components: 0.5 part of soya lecithin, 0.5 part of a fatty alcohol sulphonate, 6 parts of an alkyl-arylsulphonate (for example ® Marlopon A 375 or ® Marlopon At 50 from Messrs. Chemische Werke Hüls AG, Marl), 4 parts of an alkanolamine, 6 parts of cyclohexanol, 15 parts of 1,2-propylene glycol, 15 parts of an organic yellow pigment, 15 parts of naphthalenetetracarboxylic acid and 2 parts of carbon black, with the aid of a sand mill.

The resulting paste is diluted with 36 parts of triethylene glycol and filled into a film bag made from polyvinyl alcohol containing 10% of acetyl groups. The pack, which has been sealed by welding, dissolves within a few minutes in an aqueous stoving lacquer which is based on an adduct of maleic acid and unsaturated oils, which has been neutralized with amines, and a water-soluble melamine resin.

A coating obtained by dipping or spraying is stoved for 30 minutes at 150° C. and gives a hard coating of flawless quality.

We claim:

1. A film pack consisting of a bag of a water-soluble film selected from the group consisting of polyvinyl alcohol or carboxyalkyl cellulose in film form, said film being folded to form containers and sealed on all sides, and enclosed therein a pigment paste consisting essentially of the components:
   (I) at least one pigment selected from the group consisting of inorganic pigments, organic pigments and mixture thereof;
   (II) at least one extender;
   (III) 10–80% be weight, based on the total weight of components (I) and (II), of a component selected from the group consisting of monohydric primary aliphatic straight chain alkanols having 1 to 4 carbon atoms, monohydric secondary aliphatic straight chain alkanols having 1 to 4 carbon atoms, monohydric tertiary aliphatic straight chain alkanols having 1 to 4 carbon atoms, monohydric branched alkanols having 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols, and unsaturated alcohols; and
   (IV) 5–20% by weight, relative to the content of components (I) and (II) of at least one of wetting agents, dispersing agents or emulsifiers selected from the group consisting of fatty alcohols, fatty alcohol sulphonates, alkyl-aryl-sulphonates, alkyl-aryl-polyglycol ethers, fatty acid amines, mono-di- and tri-alkanolamines, fatty alcohol oxethylates, fatty acid alkanolamides, alkali metal salts of polyacrylic acids, soya lecithin and polyethylene oxide, which are different from and soluble in component (III),
   whereby said water-soluble film is diffusion-tight in respect to the solvents in the pigment paste and whereby said brittle water-soluble film becomes more flexible and more resistant to mechanical stress by the presence of component III with component IV in said pigment paste forming a plasticizing of said water-soluble film so that said bag is stored without coagulation and agglomeration and that said bag dissolves in a water-diluted coating agent in which said bag is compatible and forms a homogeneous coating of uniform color after curing or drying said coating.

2. The film pack as defined in claim 1 wherein said inorganic pigment of component (I) of said pigment paste is a metal powder.

3. The film pack as defined in claim 1, wherein said organic pigment of component (I) of said pigment paste is carbon black.

4. The film pack as defined in claim 1, in which said pigment paste contains between 0 and 80% by weight of component (II), relative to component (I).

5. The film pack as defined in claim 1, wherein said water-soluble film is polyvinyl alcohol 6. The film pack as defined in claim 1, wherein said water-soluble film is polyvinylalcohol containing between 0.5 and 2% ester groups.

7. The film pack as defined in claim 6, wherein said water-soluble film is polyvinylalcohol containing up to 35% acetyl groups.

8. The film pack as defined in claim 1 wherein said water-soluble film is carboxyalkylcellulose.

9. The film pack as defined in claim 1, wherein said water-soluble film is selected from the group consisting of carboxymethylcellulose, carboxyethylcellulose and carboxymethylpropylcellulose.

10. In a process for coloring and toning a water-diluted coating agent with a pigment paste, the improvement which consists of immersing at least one film pack in said water-diluted coating agent, said film pack consisting of a bag of a water-soluble film selected from the group consisting of polyvinyl alcohol or carboxyalkyl cellulose in film form, said film being folded to form containers and sealed on all sides, and enclosed therein a pigment paste consisting essentially of the components:

(I) at least one pigment selected from the group consisting of inorganic pigments, organic pigments and mixture thereof;

(II) at least one extender;

(III) 10-80% by weight, based on the total weight of components (I) and (II), of a component selected from the group consisting of monohydric primary aliphatic straight chain alkanols having 1 to 4 carbon atoms, monohydric secondary aliphatic straight chain alkanols having 1 to 4 carbon atoms, monohydric tertiary aliphatic straight chain alkanols having 1 to 4 carbon atoms, monohydric branched alkanols having 1 to 4 carbon atoms, alkylene glycols, alkylene glycol monoalkyl ethers with 1 to 4 carbon atoms in the alkyl radical, polyalkylene glycols, polyalkylene glycol monoalkyl ethers with 1 to 4 carbon atoms in the alkyl radical, alicyclic alcohols, araliphatic alcohols, and unsaturated alcohols; and (IV) 5-20% be weight, relative to the contents of components (I) and (II) of at least one of wetting agents, dispersing agents or emulsifiers selected from the group consisting of fatty alcohols, fatty alcohol sulphonates, alkyl-aryl-sulphonates, alkyl-aryl-polyglycol ethers, fatty acid amines, mono-, di- and tri-alkanolamines, fatty alcohol oxethylates, fatty acid alkanolamides, alkali metal salts of polyacrylic acids, soya lecithin and polyethylene oxide, which are different from and soluble in component (III);

said film pack dissolving in said water-diluted coating agent after being immersed in said coating agent and distributing said pigment paste in said coating agent, so that said coating agent forms a compatible and homogeneous coating of uniform color after curing or drying said coating.

* * * * *